(12) United States Patent
Liebetreu et al.

(10) Patent No.: US 10,967,687 B2
(45) Date of Patent: Apr. 6, 2021

(54) SYSTEM AND METHOD FOR SEMI-AUTONOMOUS REPETITIVE OPERATION OF A TIRE CHANGER MACHINE

(71) Applicant: Hunter Engineering Company, Bridgeton, MO (US)

(72) Inventors: Peter N. Liebetreu, St. Louis, MO (US); Steven K. Molbach, Ballwin, MO (US); Joel A. Clasquin, Highland, IL (US); Jeffrey P. Talbott, Florissant, MO (US); Charles Polster, Edwardsville, IL (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 322 days.

(21) Appl. No.: 16/275,838

(22) Filed: Feb. 14, 2019

(65) Prior Publication Data

US 2019/0255894 A1 Aug. 22, 2019

Related U.S. Application Data

(60) Provisional application No. 62/632,075, filed on Feb. 19, 2018.

(51) Int. Cl.
*B60C 25/05* (2006.01)
*G01M 1/04* (2006.01)
*B60C 25/138* (2006.01)

(52) U.S. Cl.
CPC ........ *B60C 25/0515* (2013.01); *B60C 25/056* (2013.01); *B60C 25/138* (2013.01); *G01M 1/045* (2013.01)

(58) Field of Classification Search
CPC . B60C 25/0515; B60C 25/056; B60C 25/138; G01M 1/045
See application file for complete search history.

(56) References Cited

U.S. PATENT DOCUMENTS

| | | |
|---|---|---|
| 8,307,874 B1 | 11/2012 | Hanneken et al. |
| 8,387,675 B1 | 3/2013 | Vaninger et al. |
| 8,537,347 B1 | 9/2013 | Clasquin et al. |
| 8,613,303 B1* | 12/2013 | Hanneken ............. B60C 25/138 157/1.17 |
| 8,770,254 B1* | 7/2014 | Hanneken ............. B60C 25/138 157/1.17 |
| 8,783,326 B1* | 7/2014 | Vaninger ............. B60C 25/0551 157/1.24 |
| D725,689 S | 3/2015 | Vaninger et al. |
| 8,973,640 B1 | 3/2015 | Hanneken |
| 9,073,394 B1 | 7/2015 | Clasquin et al. |
| 9,434,219 B1* | 9/2016 | Clasquin ............. B60C 25/0548 |
| 9,662,945 B2* | 5/2017 | Molbach ............. B60C 25/0515 |
| 10,906,364 B2* | 2/2021 | Gonzaga ............... B60C 25/135 |

* cited by examiner

*Primary Examiner* — David B. Thomas
(74) *Attorney, Agent, or Firm* — Sandberg Phoenix & von Gontard, P.C.

(57) ABSTRACT

A tire changer machine, and method of operation, configured to enable a single operator to carry out tire change procedures for a set of wheel assemblies by interleaving wheel assembly balancing procedures on a wheel balancer machine with an automated tire demount process carried out under direction of a control system of the tire changer without continuous operator input or supervision.

15 Claims, 7 Drawing Sheets

FIGURE 1 – PRIOR ART

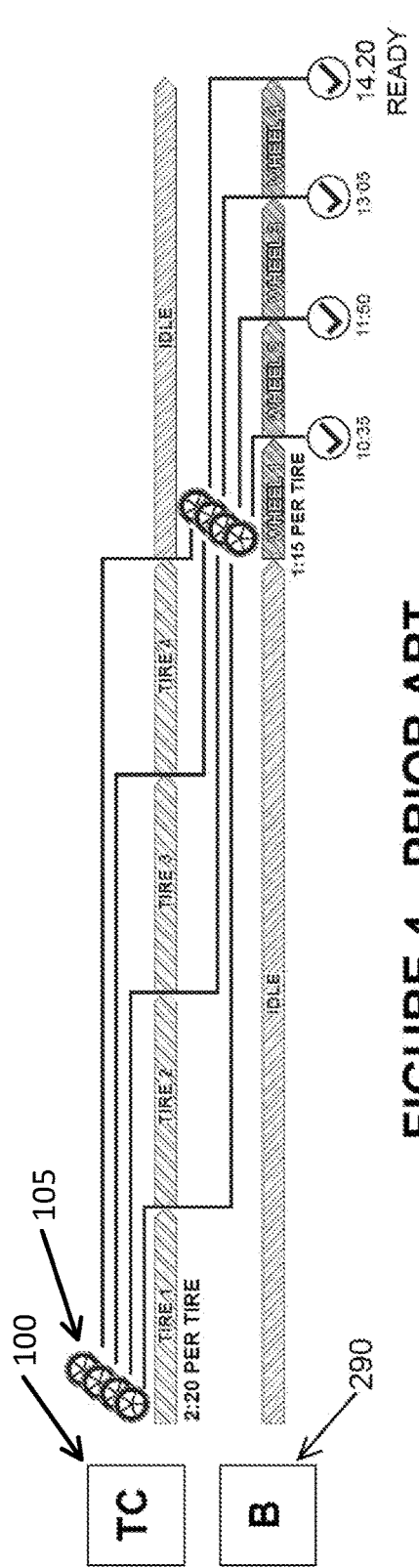
FIGURE 4 - PRIOR ART
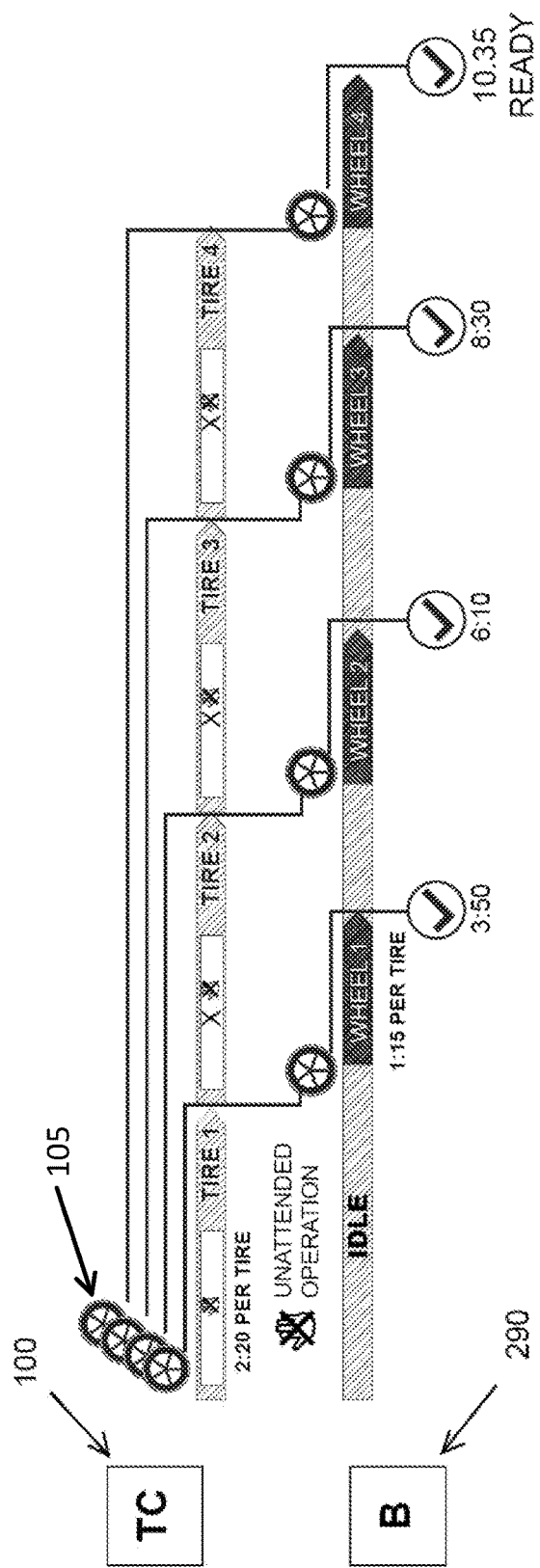
FIGURE 5

SYSTEM AND METHOD FOR SEMI-AUTONOMOUS REPETITIVE OPERATION OF A TIRE CHANGER MACHINE

CROSS-REFERENCE TO RELATED APPLICATIONS

The present application is related to, and claims priority from, U.S. Provisional Patent Application Ser. No. 62/632,075 filed on Feb. 19, 2018, which is herein incorporated by reference.

STATEMENT REGARDING FEDERALLY SPONSORED RESEARCH

Not Applicable.

BACKGROUND OF THE INVENTION

The present invention relates generally to tire changer machines, systems and methods and more specifically to interactive tire changer machines, systems and methods for selective automated operation of various aspects of repetitive tire change procedures.

The process of manually removing a tire from a wheel rim and replacing it with another tire, referred to herein as tire changing, can be both difficult and time consuming. In response to such difficulties, machines have been developed to facilitate the tire changing process. These machines commonly include a clamping mechanism for holding the wheel rim, and a drive assembly for rotating the clamped wheel rim about an axis. A bead breaker tool brought into engagement with the tire exerts pressure on the tire adjacent the wheel rim during rotation to break the tire bead seal, while a tire removal tool, sometimes referred to as a demount tool, is used to pull the bead of the tire off the rotating wheel rim as the wheel rim, allowing the tire to be separated from the rim for removal. During an installation process, manually actuated or machine implemented tools are utilized to press the tire onto the wheel rim. While known tire changing machines have obtained some level of success in reducing the time and labor associated with changing a tire, there remains room for improvement, particularly for repetitive tire change procedures wherein two or more wheel assemblies from a vehicle are being changed.

Traditionally, tire changer machines require manually operated hand tools, commonly referred to as levers, to extract tires from a wheel rim. The proper use of such levers requires effort and skill on the part of the machine operators to effectively remove a tire from a wheel rim without damaging the wheel rim. In today's marketplace involving a wide variety of wheel rims and tires, some of which have stiff sidewalls and are very difficult to change using hand-operated levers, some tire changer machine manufacturers have sought to implement machine powered tools in place of hand-operated lever tools. These tire changers are referred to as "lever-less style" machines.

Most tire changer machines, even lever-less style ones, presently available operate under full manual control of a skilled person such as a trained machine technician. Due to changes in the tire industry which have resulted in a proliferation of larger diameter tires, tires having shorter sidewalls, and tires having very rigid sidewalls providing run-flat capabilities, modern tires are becoming increasingly difficult to service by traditional, substantially manually performed methods, using tire changing machines. Because of such difficulties, efforts are underway to automate aspects of tire change procedures in order to offer power and speed advantages to the technician. Automating tire change procedures can avoid problems presented by some tire and wheel rim combinations.

Examples of such problems encountered when changing modern tires include difficulties in clamping certain types of wheel rims without damaging them, managing an excessive amount of force generated with machine tools, and positional conflicts between components of the machine and portions of the wheel rim and tire. Additional problems arise when failing to properly account for fragile tire and wheel rim features such as installed tire pressure monitoring system (TPMS) sensors, and for variations in the inner geometry in the wheel rims. Some tire and wheel rim combinations may result in a modern tire changer having an inability to dislodge and grab certain tire beads, having a tendency for some machine tools to become "stuck" in demount operations, having a tendency for pusher tools to slip on the surface of certain tire sidewalls, and difficulties associated with pushing large and stiff walled tires to seat the tire beads on certain types of rims.

Efforts to automate aspects of tire change procedures for tire changing machines are now underway. An exemplary procedure that would be advantageous to automate is the demounting and removal of a tire from a wheel rim. In contrast to traditional tire changer machines that largely rely on a technician using a bead lever and brute force to lift the tire bead off of the wheel, a modern lever-less tire changer machine no longer depends on the use of a bead lever or the technician's strength to lift the tire bead off of the wheel rim. Various mechanisms have been designed in lever-less machines to apply the force required to lift the bead off the wheel, commonly employing a pneumatic actuator. Such lever-less machines are nonetheless susceptible to one or more of the problems discussed above, any of which can frustrate demounting of a tire, and thus have not completely solved vexing needs in the marketplace to provide effective tire changing capability for a full range of modern tires and wheel rims. Effective automation of tire change procedures therefore remains somewhat elusive to tire changer machine manufacturers, and the problems mentioned above can frustrate machine users. Tire changer machine providers and users would each benefit from effective automation procedures, particularly when sequentially performing repetitive procedures, such as dismounting tires from two or more wheels of a motor vehicle.

BRIEF DESCRIPTION OF THE DRAWINGS

In the accompanying drawings which form part of the specification:

FIG. 4 is a prior art workflow representation illustrating operator time required to complete a repetitive tire change and wheel balance process for a set of wheels on a vehicle using a conventional tire changer machine in combination with a wheel balancer machine;

FIG. 5 is a workflow representation illustrating potential operator time savings achieved utilizing a method of the present disclosure to automate on a tire changer machine of the present disclosure, portions of the repetitive tire change and wheel balance process completed in combination with a wheel balancer machine;

Corresponding reference numerals indicate corresponding parts throughout the several figures of the drawings. It is to be understood that the drawings are for illustrating the concepts set forth in the present disclosure and are not to scale.

Figure 1:
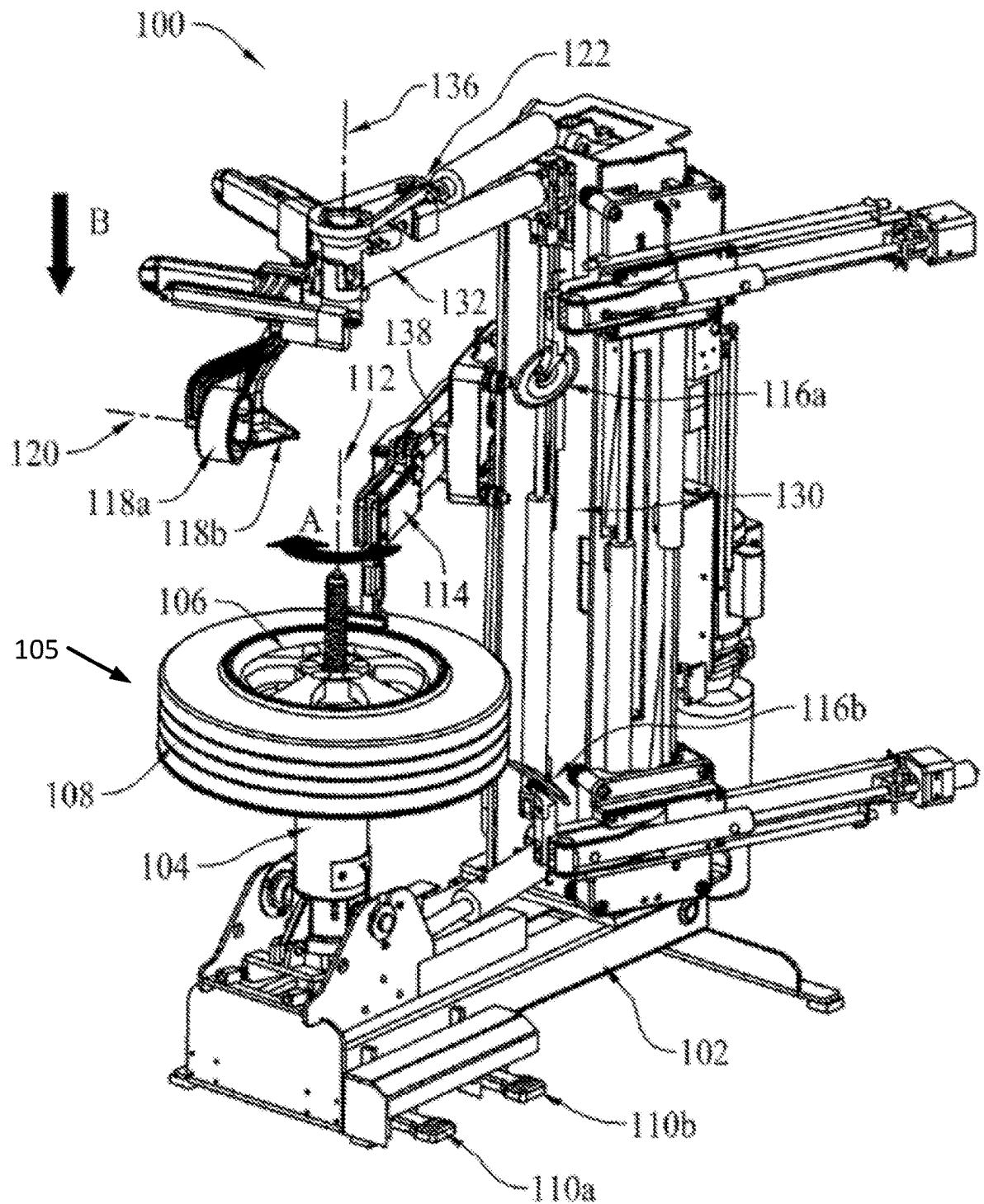
FIG. 1 is a perspective view of an exemplary prior art tire changer system.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Turning to the Figures, a prior art tire changer machine 100 is shown generally in FIG. 1 including a frame or base 102 and a rotatable drive shaft assembly 104 attached to the base 102. The drive shaft assembly 104 includes a post or shaft adapted to receive and retain a wheel assembly 105 consisting of a wheel rim 106 having a tire 108. The wheel rim 106 is secured to the drive shaft assembly 104 with a clamping mechanism after the wheel rim 106 and tire 108 are loaded and mounted onto the machine 100. In an exemplary embodiment, the clamping mechanism is as described in U.S. Pat. No. 8,307,874 B1 to Hanneken et al., herein incorporated by reference, and may therefore accommodate certain types of wheel assemblies that conventional tire changing machines may not. In other embodiments, alternative clamping mechanisms known in the art may be utilized. The drive mechanism 104, as described in U.S. Pat. No. 8,307,874 B1 to Hanneken et al., is configured for movement to different positions to assist with wheel assembly 105 lifting and associated procedures to mount the wheel rim 106 to the drive assembly 104.

After the wheel rim 106 is clamped in position, a machine operator manipulates an input selector 110a which operates the drive shaft assembly 104 to rotate the wheel rim 106 and tire 108 about a drive axis 112 of the drive shaft assembly 104. In different exemplary embodiments, the drive shaft assembly 104 may be pneumatically or hydraulically actuated or powered electrically. In another embodiment, a rotating turntable or other mechanism is provided in lieu of the drive shaft assembly 104. Clockwise and counterclockwise rotation about the axis 112, indicated by the arrow A, are possible in different embodiments. While the drive axis 112 is illustrated as being generally vertical in the embodiment depicted, the axis 112 may be oriented horizontally or otherwise in other embodiments, and the axis 112 may be selectively adjusted to different positions relative to the base 102.

As the wheel rim 106 is rotated about the axis 112, a tool assembly 114 is brought into physical contact or engagement with the tire 108 at respective locations proximate an outer periphery of the rim 106. With the tool assembly 114 in the proper engaging position with respect to the tire 108 and wheel rim 106, the tire 108 and wheel rim 106 are rotated about the axis 112 clockwise or counterclockwise. Additionally, the tool assembly 114 is utilized to mount a tire 108 to the wheel rim 106. While a single tool assembly 114 is shown that is capable of mounting and demounting tires from the wheel rim, it is contemplated that separately provided mounting and demounting tools may likewise be provided and utilized.

The tool assembly 114 includes a feature such as a tire hook to separate or displace an inner circumference of the tire 108 including a tire bead (not shown in FIG. 1) over an outer lip of the wheel rim 106 to remove the tire 108 in a demount operation. Alternatively, the tire hook engages the inner circumference of the tire 108 including the tire bead, in a tire bead seat of the wheel rim 106 to install or mount the tire 108 to the wheel rim 106. The tool assembly is further described in U.S. Pat. No. 8,973,640 B1 to Hanneken, which is herein incorporated by reference.

Machine tools 116a, 116b are provided, and sometimes referred to as bead breaker tools, to exert pressure on the tire 108 to either break a tire bead seal from the rim 106 or to push or displace the inner circumference of the tire 108 over the outer lip of the wheel rim 106 during a mounting operation. In FIG. 1, two bead breaker tools 116a and 116b are shown, one located above the tire 108, and the other located below the tire 108. In another embodiment, a single bead breaker tool 116 could be provided. Exemplary operation of the bead breaker tools 116 are more completely described in U.S. Pat. No. 8,613,303 B1 to Hanneken et al., which is herein incorporated by reference.

Machine tools 118a and 118b are also provided and referred to as pressing tools, pusher tools, or bead pressing devices. As shown in FIG. 1, bead pressing devices 118a, 118b are configured to exert pressure on the tire sidewall during tire mounting and demounting procedures. The bead pressing device 118a, is a roller device that is mounted for rotation about an axis 120 which is substantially perpendicular to the machine drive axis 112. Thus, when the roller device 118a is placed in contact with the tire sidewall, it rotates about the axis 120 as the tire 108 is rotated about the machine drive axis 112 enabling the device 118a to remain in a fixed position relative to the machine drive axis 112. When desired, the roller device 118a is also operable to rotate in tandem with the tire 108 about the drive axis 112.

The bead pressing device 118b is adapted for contact with the tire 108 and includes a frictional engagement surface to facilitate movement relative to the tire 108. When engaged to the tire sidewall, the pressing device 118b rotates about an axis 136, coaxial with the drive axis 112, and with the tire 108. Optionally the pressing device 118b incorporates a feature that engages a spoke, a hole, or other feature of the wheel rim 106 to ensure that the pressing device 118b (and also the tire 108 with which it is engaged) rotates synchronously along with the wheel rim 106 and that the pressing device 118b does not move relative to the wheel rim 106. Alternatively, the pressing device 118b is coupled with an independent drive mechanism 122 that pushes the bead pressing device 118b and the tire 108 in the direction of rim rotation about the drive axis 112. This is sometimes referred to as establishing a "traction point" in addition to pushing the tire bead into a drop center of the wheel rim 106 when mounting the tire 108.

The pressing tools 118a, 118b are spaced from one another to maintain the tire bead in the drop center of the wheel rim 106 during tire demounting procedures, or to push the tire bead into the drop center during a tire mounting procedure. While two bead pressing devices 118a and 118b are shown in FIG. 1, additional bead pressing devices 118 may be provided. Two or more bead pressing devices 118 are beneficial for mounting or demounting larger diameter tires and/or tires with stiff sidewalls, although it is understood that in some cases a single bead pressing device 118 may be sufficient to mount or demount these types of tires. Operation of the pressing tools and the independent drive mechanism are more completely described in U.S. Pat. No. 8,387,675 B1 to Vaninger et al, which is herein incorporated by reference.

In different exemplary embodiments, the tool assembly 114, and the tools 116, 118 may be pneumatically or hydraulically actuated, or powered electrically, and serve to supply sufficient tire insertion or removal forces at the correct angles and locations with respect to the tire 108 such that the bead of the tire 108 is forced out of, or onto, the bead seat on the wheel rim 106. While exemplary tools 116, 118 are illustrated in combination with the tool assembly 114, still other tire changing tools and devices may be provided and used for bead breaking, tire mounting and/or demounting, locating a valve stem, locating a wheel weight, locating a wheel sensor such as a Tire Pressure Monitoring System (TPMS) sensor, or other purposes. Such other tools may be provided in addition to or in lieu of the tools 116, 118 as depicted.

To assist with locating the tool assembly 114 and the tools 116, 118 a sensory capability is provide in the machine 100 to detect a position of the tool assembly 114 and the tools 116, 118 (or other tools that may be provided) with respect to the tire 108 and/or wheel rim 106. For example, one known tire changing machine includes a switch mechanism that changes state when the bead breaker tool moves just beyond the outer edge of the rim 106, ensuring that the bead breaker tool is positioned to engage the tire 108 at a predetermined location. Machine vision systems are also known that help align the machine tools with respect to the wheel rim 106 at predetermined locations. As another example, force feedback sensors may be integrated for monitoring and controlling features of the machine components, including but not limited to the machine tools, when in use. While such sensory capabilities may be beneficial, in some embodiments they may be considered optional and accordingly not be utilized.

The machine 100 as shown also includes a support tower 130 extending from the base 102 at a location spaced from the drive assembly 104, to a height well above the tire 108 and wheel rim 106. A linkage 132 extends outwardly from the support tower 130, and the pressing tools 118a, 118b are coupled to the linkage 132. The linkage 132 is movable by an actuator on the support tower 130 in a direction parallel to arrow B in FIG. 1, such that as the linkage 132 is moved, the bead pressing devices carried on the linkage 132 are moved toward or away from the tire 108. As such, the bead pressing devices 118a, 118b may be moved in a direction parallel to the machine drive axis 112.

In addition to movement parallel to the machine drive axis 112, the bead pressing devices 118a, 118b are mounted to the linkage 132 such that they are rotatable about the fixed axis 136 coincident with the machine drive axis 112. That is, the pressing devices 118 are rotatable about the axis 136 coaxial with the machine drive axis 112. As such, when the bead pressing devices 118 are in contact with the tire 108, they rotate with the tire 108 about the drive axis 112. Unlike conventional tire changing machines, including but not limited to, so-called swing-arm style machines, the rotational axis 136 for the pressing devices 118 is fixed at a set distance and location from the tower support frame 130.

While locating the rotation axis 136 of the pressing devices 118 at a fixed and set distance and location from the tower support frame 130 can be beneficial for the reasons stated, it is recognized that in further and/or alternative embodiments neither the location of the drive axis 112 nor the rotational axis 136 for the pressing devices need necessarily be fixed in such a manner so long as the axes 112 and 136 are positionable to become coincident when the pressing devices 118 are needed. That is, either or both of the axes 112 and 136 may be movable to different operating positions, distances and orientations relative to each other and relative to the tower support frame 130 for reasons not pertinent to use of the pressing devices 118a, 118b, but when the pressing devices 118a, 118b are to be engaged to the tire, the axes 112 and 136 are moved to become coincident once again so that the bead pressing devices 118 may rotate with the tire 108 about the drive axis 112.

The bead pressing devices 118a, 118b are further movable in a direction perpendicular to the axis 136 and the drive axis 112. That is, actuators are provided to move the bead pressing devices 118a, 118b towards and away from the drive axis 112, such that the bead pressing devices 118 may be manually or automatically adjusted to different radial positions measured from the drive axis 112 to accommodate tires and rims of different diameters. The bead pressing devices 118 may be manually or automatically positioned in the direction perpendicular to the drive axis 112 as described below.

The bead breaker tools 116a, 116b are coupled to and supported by the tower support frame 130 (or other support structure in an alternative embodiment) via linkages that move in vertical and horizontal directions to position the bead breaker tools 116a, 116b relative to the wheel rim 106 and tire 108 for use.

The tool assembly 114 is likewise coupled to a support 138 and associated linkages on the tower support frame 130, such that the support 138 is movable relative to the tower support frame 130 with actuators in vertical and horizontal directions. As such, the tool assembly 114 is movable toward and away from the drive axis 112 in a radial direction, and toward and away from the tire 108 and wheel rim 106 in a vertical direction parallel to arrow B. The tool assembly 114 shown in FIG. 1 is independently positionable from the tools 116, 118, although it is understood that the assembly 114 and the tools 116, 118 may be used in concert while changing the tire 108. Also, while the tool assembly 114 and the tools 116, 118 are all coupled to the same tower support frame 130, they could alternatively be supported with independent support frames and structures separately provided on the machine 100 in place of a single tower support frame 130.

The positions of the tool assembly 114 and the tools 116, 118, and operation of the drive assembly 104 and other features of the machine 100 are coordinated by a control unit including a programmable controller and actuator components operatively connected to the programmable controller.

A machine operator may manipulate input selectors 110a, and 110b, for example, which communicate with the control unit to move the tool assembly 114, and the tools 116, 118 to desired positions and/or to operate the drive assembly 104 or activate other machine features. In FIG. 1, the input selectors 110a, 110b may be foot pedals located near the bottom of the machine base 102 for convenient use of the machine operator(s). In other embodiments, other known input selectors, including but not limited to levers, buttons, knobs, switches, joysticks, and touch sensitive screens may be employed in various locations on or near the machine 100. An operator station including a display and an input device such as a keyboard or other input selectors is optionally provided for the benefit of the operator.

Various ways of automating certain tire change procedures using force and position feedback sensors and the like have been proposed that facilitate automated machine operations and avoid human error and numerous difficulties heretofore experienced in operating the machine tools to change tires with varying degrees of involvement by human operators. Indeed, substantially fully automated tire changing from start to finish is believed to have been enabled in which no human assistance is required to mount or demount a tire to/from a wheel rim, other than to start the applicable mount or de-mount mode when ready. Improvements are, however, desirable. Specifically, it is desired to make the machines easier and safer to utilize when performing repetitive tire changing procedures on a set of tires, such as may be associated with a single vehicle or fleet of similar vehicles.

Figure 2:
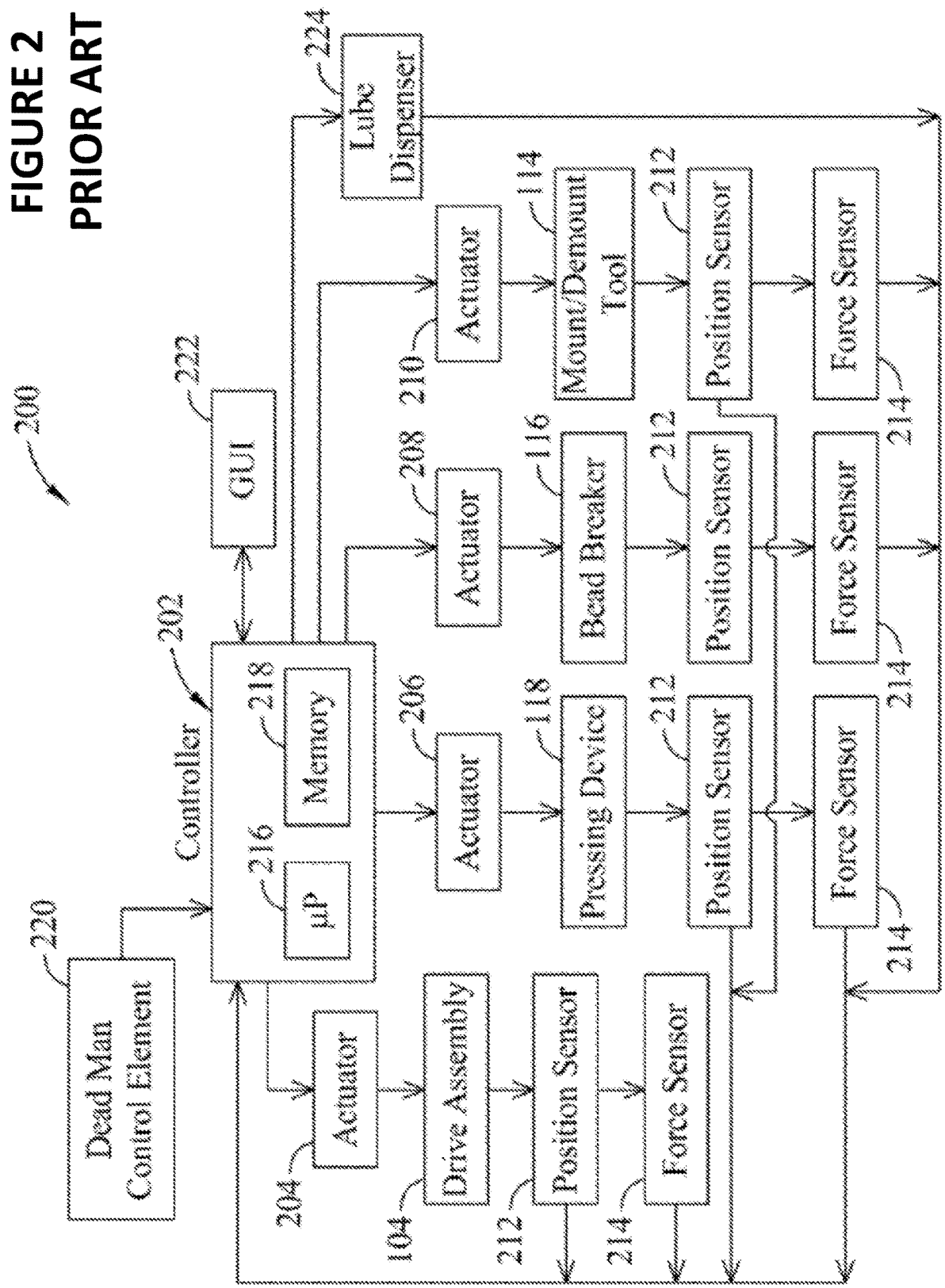
FIG. 2 is system block diagram representing exemplary prior art components of a tire changer system.

FIG. 2 schematically illustrates a prior art control system 200 implemented in the machine 100 to change tires in an automated, but interactive manner with a human operator, as described in U.S. Pat. No. 9,434,219 B1 to Clasquin et al., which is herein incorporated by reference. Using the control system 200, tire change procedures can be substantially automated such that little or no operator input is required, but nonetheless allowing human operators an ability to control, oversee and adjust machine operations if needed or as desired. The control system 200 can provide the benefits of full automation of certain aspects of tire change procedures while leaving other aspects in the discretion and manual control of the machine operator. As such, varying amounts of operator participation in tire demount procedures can be provided.

As shown in the embodiment of FIG. 2, the control system 200 includes a controller 202 operatively coupled to actuators directing the various tools provided on the machine 100. More specifically, the controller 200 is operatively coupled to an actuator 204 associated with the drive assembly 104, an actuator 206 associated with one of the pressing devices 118, an actuator 208 associated with one of the bead breakers 116, and an actuator 210 associated with the mount and de-mount tool assembly 114. Position sensors 212 and force sensors 214, such as those described in U.S. Pat. Nos. 8,770,254 B1 and 8,387,675 B1 provide closed loop control feedback as shown, and facilitate positioning the tools in the appropriate locations for particular tire change procedures in an automated manner.

The actuators 204, 206, 208 and 210 may each correspond to multiple actuators to drive the associated components and effect movement therefore in three dimensional space. Rotational movement is provided, with the actuator 204 for the drive assembly 104. Linear movement in vertical and horizontal directions, is provided by different actuators associated with the machine tools 114, 116 and 118. Using the respective actuators, the drive assembly 104 is operated to rotate the wheel rim 106 and tire 108 about the drive axis 112 to and from desired rotational positions; radial positions of the machine tools 114, 116, 118 measured in a direction perpendicular to the drive axis 112 (Arrow B, FIG. 1) are adjusted to meet varying diameters of wheel rims 106 and tires 108; and axial positions of the tools 114, 116, 118 are adjusted along an axis parallel to the drive axis 112 to engage or disengage the tools to and from the tire 108. The tools 114, 116, 118 are positioned to apply appropriately directed pressure at the appropriate locations on the tire 108 to mount or demount the tire 108 to and from the wheel rim 106.

As still another option, further feedback elements such as machine vision elements are provided in the control system 200 to facilitate automated positioning of the drive assembly 104 tools 114 without the machine having prior knowledge of a rim type or tire type involved in the demount procedure. In such scenarios, the profile needed to position the tool assembly 114 may be self-identifying to the machine 100.

Optionally, the controller 202 is coupled with a spindle actuator (not shown in FIG. 2) that moves the drive axis 112 (FIG. 1) laterally relative to the machine base 102. Thus, for example, in such an embodiment the drive axis 112 (and also the tire 108 and wheel rim 106 coupled to the drive axis 112 with the clamping mechanism) is moved by the spindle actuator in a direction generally perpendicular to the drive axis 112, such as a direction extending toward or away from the tower support frame 130 shown in FIG. 1. A machine equipped with such a spindle actuator may therefore move the drive axis 112 in a radial direction toward and away from the various tools 114, 116 and 118. The spindle actuator may likewise be equipped with force and position sensors providing an ability for automated, closed loop control of the actuator.

In various embodiments, the controller 202 is a microcomputer, a programmable logic controller, or other processor-based device. Accordingly, the controller 202 includes a microprocessor 216 and a memory 218 for storing software instructions, software control algorithms and other information as required for the machine 100 to function in the manner described. The controller memory 218 is a random access memory (RAM), or other form of memory used in conjunction with RAM memory, including but not limited to flash memory (FLASH), programmable read only memory (PROM), and electronically erasable programmable read only memory (EEPROM). Alternatively, non-processor based electronics and circuitry may be provided in the controller 202 with equal effect to serve similar objectives. For example, a supercapacitor may be provided to give the controller time to store procedure sensitive data such as the current state in a software based state machine in the event of power loss. Other elements such as line filters and capacitors for filtering noisy power are included. Data storage such as a CD-ROM, DVD, hard disk, or access to a remote database is provided for storage of various tire profiles that may be recalled to optimize tire mount or demount processes. The tire profiles may include detailed data regarding dimensional aspects of tires to be changed and other information concerning the tires that may be useful and beneficial to the machine operator or the control system.

In various exemplary embodiments of the control system 200, the actuators 204, 206, 208 and 210 may respectively include hydraulic cylinders, pneumatic actuators, electric motors, or still other types of actuators. The actuator types for the actuators 204, 206, 208 and 210 may be of the same or different type (e.g., hydraulic, pneumatic, electric or other) in numerous variations of machines.

Likewise, in various exemplary embodiments, the position sensors 212 utilized in the control system 200 may include positioning encoders, proximity switches or other switch devices, Hall Effect sensors, machine vision elements and other sensors and technologies known in the art. More than one type of positioning sensor or sensing technology may be utilized in numerous variations of machines with similar effects.

The control system 200 may also include a dead man control element 220 and a graphic user interface (GUI) 222. The dead man control element 220 and GUI 222 allow for limited control of the automated functionality of the machine as well as informative informational feedback to the operator regarding execution of automated tire change procedures. It should be noted that, as used herein, the term "procedure" refers to a controlled movement of one or more machine components for a particular purpose to accomplish a task in a tire change process executed with the machine. A procedure may include a single step or movement involving a single actuator and a single component of the machine (e.g., the drive assembly 104 or the tools 114, 116, 118), multiple steps or movement involving a single actuator or component, single steps or movements of multiple actuators and components, or multiple steps or movements of multiple components.

During use, an operator selects, using the GUI 222, a specific procedure or procedures to be run from a set of available procedures stored in the controller memory 218, and therefore provides an input to the machine concerning which of the various tire change procedures are desired, and to some extent the order of execution for the procedures. Likewise, with or without assistance of the GUI 222, an operator may manipulate one or more input selectors or control elements that cause execution of a specific automated tire change procedure such as, a wheel lift procedure, a lower tire bead loosening procedure, an upper tire bead loosening procedure, and an upper bead demounting procedure, among others. A number of other procedures and control routines and algorithms may likewise be selected, including but not limited to locating tire valve stems, locating TPMS sensors, locating wheel weights, and locating machine tools in proper locations. Such selection of specific procedures is advantageous when certain procedures are known to the operator to be inapplicable. For example, if it is known that a given wheel rim does not include wheel weights or if it is known that TPMS sensors are not included, procedures designed to detect the wheel weights or TPMS sensors need not be run to successfully complete a tire change.

A machine operator may select an encompassing procedure that incorporates multiple specific procedures with the end result being, for example, complete tire removal or complete tire mounting. For example, rather than selecting specific procedures, the operator selects a tire mount mode or a tire demount mode. When the mount or demount modes are selected, the controller 202 recalls and runs in series all the various procedures pertinent to the mode selected. This may result in slower tire change times, however, as the machine may in such instances run wheel weight detection and TPMS sensor detection procedures when in fact, none are present.

In either case, the tire changing machine 100, and more specifically the controller 202, includes a memory 218 for storing information related to an automated tire change procedure or series of procedures. The information defines motion paths, data points and other information for operating the machine components to rotate the wheel rim and tire, and to engage and disengage the various machine tools with the tire at appropriate locations. Force and position profiles associated with each of the machine components are loaded in the controller memory 218 or in other memory associated with the control system 200 and compared to actual conditions while the machine is used to make control decisions as explained in the related applications. In other embodiments, however, absolute predefined motion paths for the machine components are stored in the controller memory and executed in an open loop control scheme.

The tire changing machine 100, by virtue of the control system 200, includes an operational mode where a manually performed aspect of a procedure determined by a human operator is saved and recorded into memory 218, for example, for future recall and use by the machine 100. That is, the human operator can manually position the machine tools or other components to perform some or all of a procedure, and the controller 202 can remember the positioning path of the tools utilized if the operator chooses to save the manually performed procedure. As such, in addition to having multiple pre-programmed automated procedures, the machine 100 "learns" new and additional procedures as needs arise or according to operator preference.

For example, while the machine 100, and more specifically the controller 200, is pre-programmed with various algorithms to execute various procedures on a great variety of different wheel rims and tire sizes, an operator may determine that a variation from the pre-programmed procedures is needed or desirable, to complete the procedure on certain wheel rim and tire combinations. In the example of starting positions for the tools, the machine 100 intelligently learns and repeat appropriate start positions for tire demount procedures with some operator assistance. For example, an operator may manually position the tool assembly 114 relative to a given wheel rim 106, and the controller 202 saves the vertical and horizontal positions known to it via the sensors to create profiles for future use and recall for tires and rims of similar types, which can be linked to identifiers provided by an operator or otherwise selected on the machine 100. Thereafter, a machine operator enters or selects the identifier and the controller 202 automatically operates the actuator 210 to move the mount and demount tool 114 to the corresponding start position(s).

In still another embodiment, the controller 202 is pre-programmed with predetermined start positions, or otherwise retrieves start positions from a database or other source, and uses those start positions to execute pre-programmed tire change procedures. In such a scenario, the machine operator need not teach the start positions to the machine 100, but rather merely enters or selects the pertinent identifiers for the wheel rim 106 and tire 108 combination so that the machine can locate the appropriate profile for use in a demount process.

During operation of the tire changer machine 100, the operator employs various input selectors and control devices to manually control the machine 100. Typical control devices include foot pedals, joysticks, knobs and switches. The input selectors are typically labeled and the technician decides which control to use to perform the desired task. As a tire changer becomes automated, however, it is more important for the technician to have access to information relating to specific processes being executed in case some change or interaction is required. The graphical user interface 222 is therefore provided to display such information to the technician.

In an exemplary embodiment, the GUI 222 is a touch sensitive screen display or monitor. The screen or monitor may be a known electronic visual display that can detect the presence and location of a touch within a designated display area or areas. Various types of touch screens are known and may be used, including but not limited to resistive, capacitive and infrared touch detection. In other embodiments, the GUI 222 need not necessarily be touch sensitive, and input selectors such as a mouse, joystick, or touchpad can be provided to make selections in the GUI 222.

The GUI 222 presents user interface displays and information screens to the operator, including but not limited to alerts graphically depicting upcoming critical operations or decision points so the operation of the machine is intuitive and the overall operating environment is improved. The user interface displays and screens present data in easy to use, menu-driven form with intuitive links and graphical displays to understand the machine selections, the current point of execution at each step in the procedure, and to provide step-by-step results and feedback to the operator as the machine 100 is used. The user interface displays presented in the GUI 222 is implemented conventionally in a computer program embodied on a computer readable medium and having segments of code or instructions executed by the controller processor 216, for example, that correspond to the various functions and features described.

Figure 3:
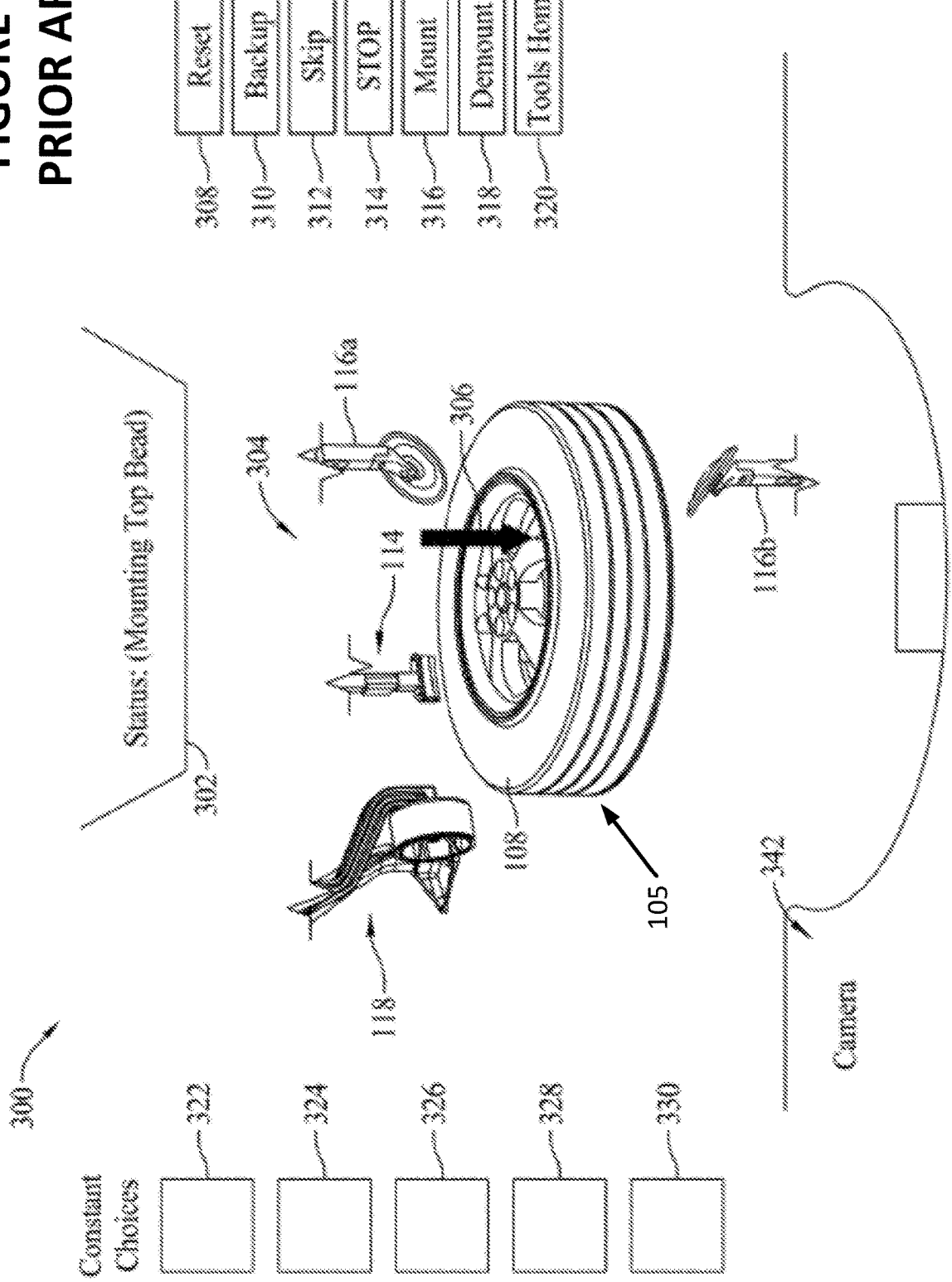
FIG. 3 is a representation of a prior art graphical user interface on a tire changer system.

FIG. 3 is an exemplary screen display 300 presented with the GUI 222. The screen display 300 includes a status field 302 identifying to the user the current status of the machine 100. In the example of FIG. 3, the status provided is "Mounting Top Bead" and corresponds to one of the procedures made available on the machine for manual or automated execution by the machine 100. A graphical section 304 is presented centrally on the screen display 300 and includes pictorial images or drawings of certain machine components (e.g., the machine tools 114, 116 and 118) in relation to the tire 108 as well as a reference point indicator 306 indicating a point of interest on the tire 108 such as a valve stem. The graphical section 304 may be animated so that one can see the images moving as the machine operation continues to execute the procedure.

Selection areas are provided to the left and right of the graphical section 304 on the exemplary screen 300. In the exemplary screen 300, on the right hand side are a reset selection area 308, a backup selection area 310, a skip selection area 312, a stop selection area 314, a mount selection area 316, a demount selection area 318 and a tools home selection area 320. On the left hand side of the exemplary screen are an additional series of possible selection areas 322, 324, 326, 328 and 330 which may or may not be available, depending upon the status of the machine. These selection areas are believed to be self-explanatory. Depending on the status of the machine, not all of these selection areas may be present for selection, or different selection areas may be provided. For example, when the first of the procedures in the mount or demount modes per the selection areas 316 and 318 are being executed, the backup selection feature 310 will not be presented. Likewise, required procedures cannot be skipped and the skip selection area 312 will not be presented, and the tools home area 320 will not be presented when the tools are already in a home position on the machine 100.

The exemplary screen displays shown and described are intuitive in nature and offer sufficient guidance for operators to take appropriate actions. The screen displays are, however, provided for the sake of illustration rather than limitation, and other intuitive and user friendly displays including other options, information and fields may likewise be provided with similar effect.

It is believed that those in the art may program the controller 202 or otherwise configure it to implement the user interface and processes reflected in the exemplary screen display without further explanation. It is recognized that not all of the process steps as shown and described to present options, information, and prompts to a user, as well as accepting prompts and operating the machine pursuant to selected options, are necessary to accomplish at least some of the benefits described. It is further recognized that the sequence of the steps as described are not necessarily limited to the particular order set forth, and that some of the functionality described can be achieved with other sequences of steps. Additional steps beyond those specifically described may be implemented in combination with the steps described.

A common tire change procedure associated with a vehicle is the replacement of multiple tires on the vehicle. On a typical vehicle, each wheel assembly 105 consists of the same size rims and tires, meaning that each wheel rim 106 and tire 108 in the set of wheel assemblies on the vehicle have similar dimensions (to within manufacturer tolerances). For an operator to replace a complete set of tires on a vehicle, each wheel assembly 105 must be removed from the vehicle, secured to the tire changer machine 100, have the old or discard tire demounted, a new tire mounted, and removed from the tire changer machine 100. At this point, the wheel assembly 105 is considered to be an unbalanced wheel assembly 105. Before reinstallation on the vehicle, each unbalanced wheel assembly 105 must be evaluated for imbalance on a wheel balancer machine 290, and any measured imbalance corrected as required. A single operator carrying out this service usually proceeds in a linear and sequential fashion, as shown in FIG. 4 by carrying out similar steps for each wheel assembly 105 in batches (i.e., removing each wheel assembly 105 from the vehicle, demounting discard tires/mounting replacement tires, balancing each wheel assembly 105, and finally, reinstalling each wheel assembly 105 on the vehicle), or sequentially, wherein one wheel assembly 105 is removed, the tire 108 replaced, the wheel assembly 105 balanced, and then reinstalled on the vehicle before the sequence is repeated with the next wheel assembly 105. Carrying out these tasks in a sequential fashion, either for individual wheels or for a set of wheels, leaves both the tire changer machine 100 and the wheel balancer machine 290 idle for significant periods of time. Furthermore, the operator is required to direct full attention either the tire changer machine 100 or the wheel balancer machine 290 during operation thereof, even when operator interaction is not immediately required.

Figure 7:
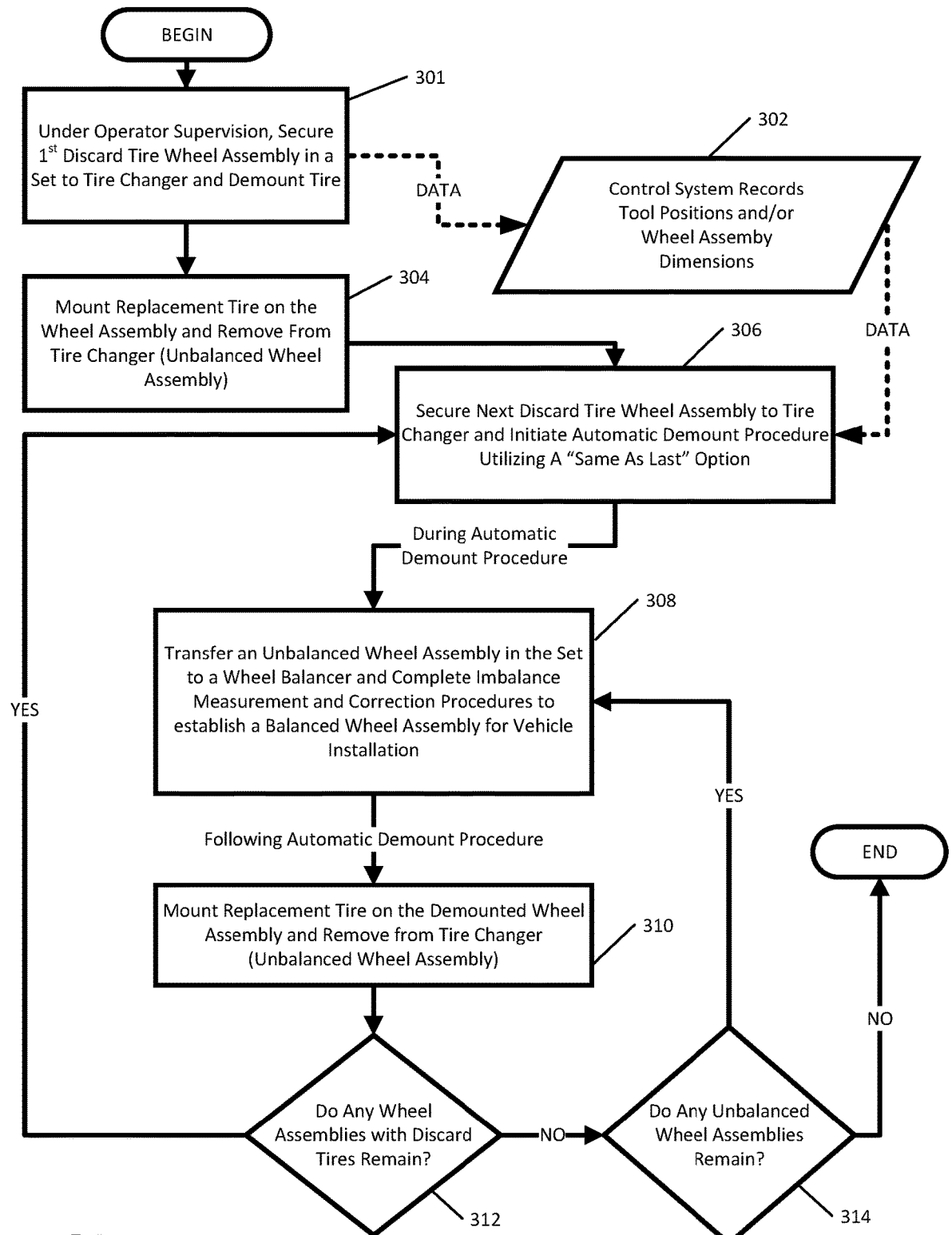
FIG. 7 is a flow chart illustrating steps in a method of the present disclosure for interleaving procedures to change and balance tires on a set of wheels.

A method of the present disclosure, when implemented using a tire changer machine 100 with a suitably programmed controller 202, in conjunction with a wheel balancer machine 290, can reduce the time required for a single operator to complete the repetitive tasks of demounting/mounting and balancing a set of wheel assemblies by enabling the operator to interleave the tire demounting/mounting process for one wheel assembly 105 with the balancing process for another wheel assembly 105 in the set as shown in FIGS. 5 and 7, and described below.

For simplicity, the interleaving procedure of the present disclosure is described in connection with a set of four wheel assemblies 105, previously removed from a vehicle, such that each wheel assembly 105 is ready to be secured to the tire changer machine 100 for replacement of a tire 108 to be discarded. The procedure begins in a conventional manner, with the first discard-tire wheel assembly 105 secured to the shaft 102 of the tire changer machine 100 for removal of the tire 108 (Box 301). The operator utilizes the various input selectors 110 and the graphical user interface 222 to position the tool assembly 114 and tools 116, 118 as necessary to dismount the tire 108 from the wheel rim 106. With the tool assembly and tools 116, 118 properly positioned, the operator signals the controller 202 to record data associated with the positions (and or wheel assembly 105 dimensions) and initiate a sequence of actions required to automatically dismount the tire 108 from the wheel rim 106 (Box 302). Absent a triggering of any fault or warning conditions, the tire changer system 100 will complete the dismount of the tire 108 from the wheel rim 106 while the operator monitors the process, such as by maintaining input on the dead-man control element 220. With the tire 108 dismounted from the wheel rim 106, the operator discards the tire 108, and operates the machine 100 to mount a replacement tire 108 to the wheel rim 106 in a conventional manner (Box 304). Upon completion, the operator removes the wheel assembly 105 from the shaft 102 of the tire changer machine 100, readying the machine to receive the next wheel assembly 105 in the set.

Figure 6:
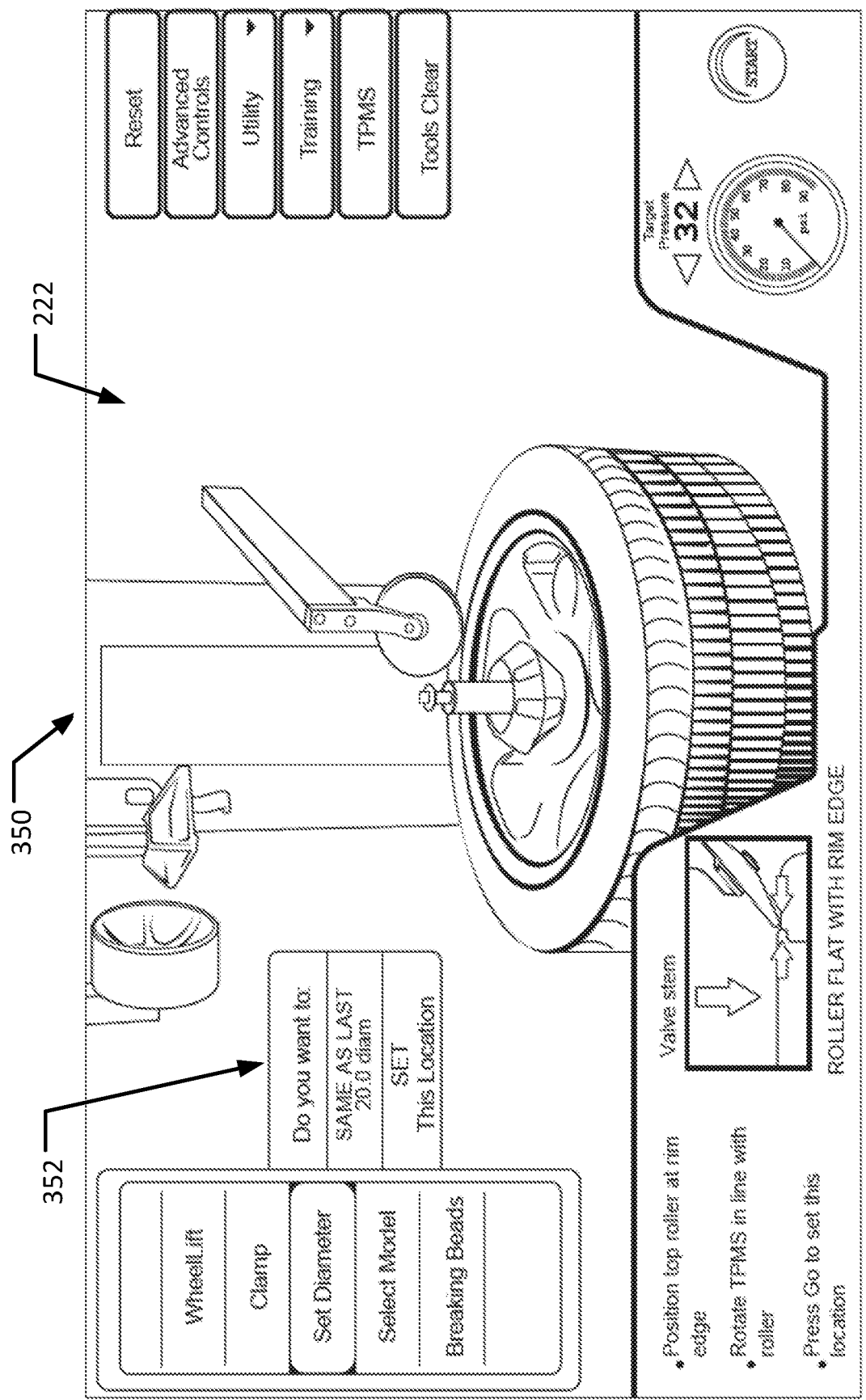
FIG. 6 is a representative graphical user interface illustrating the step of initiating a method of the present disclosure to automate a repetitive tire change procedure on a tire changer machine.

At this point in the procedure, the first wheel assembly 105 is considered to be unbalanced, i.e., ready for imbalance measurement and correction, while the three remaining wheel assemblies 105 still require tire replacement. Before proceeding with the imbalance measurement and correction for the first wheel assembly 105, the operator secures a second discard-tire wheel assembly 105 to the shaft 102 of the tire changer machine 100, and through a display screen 350 presented on the GUI 222 as shown in FIG. 6, initiates an automatic tire demount process (Box 306) by selecting a "SAME AS LAST" button 352. The controller 202 utilizes the previously recorded tool positions (and/or wheel assembly 105 dimensions) (Box 302) to direct tool movement to complete a dismount of the tire 108 from the wheel rim 106 without additional operator monitoring or interaction (i.e., without requiring the activation of a dead-man control element 220), leaving the operator free to leave the vicinity of the tire changer machine 100 and engage in other tasks.

In particular, while the tire changer machine 100 is carrying out the tire demount procedure for the second wheel assembly 105, the operator transfers the first wheel assembly 105 to the wheel balancer machine 290 for measurement and correction of imbalance forces (Box 308). As seen in FIG. 5, the time required to measure and correct imbalance forces in an unbalanced wheel assembly 105, will, under normal conditions, be less than the time required for the tire changer machine 100 to complete the automatic demount of the tire 108 from the wheel rim 106, enabling the operator to complete the imbalance correction procedures for the first wheel assembly 105 prior to returning attention to the tire changer machine 100 to discard the dismounted tire 108, and operates the tire changer machine 100 to mount a replacement tire 108 to the second wheel assembly 105 in a conventional manner (Box 310).

At the point in the procedure, the first wheel assembly 105 is balanced and ready for installation on a vehicle, the second wheel assembly 105 is unbalanced, i.e., ready for imbalance measurement and correction, and the two remaining wheel assemblies in the set each still require tire replacement. The interleaved procedures for tire demount and wheel assembly imbalance measurement/correction are repeated by the operator (Box 312 and Box 314) until each discard tire wheel assembly 105 in the set has a replacement tire, is balanced, and is ready for re-installation on the vehicle. As can be seen by comparison between FIGS. 4 and 5, the interleaved procedures can result in a time savings for the single operator over conventional sequential handling procedures for tire replacement.

While described in the context of a single vehicle service routine in which the tires are replaced on a set of four wheel assemblies 105 of a vehicle, it will be recognized that the interleaved procedures of the present disclosure may be utilized for any quantity of wheel assemblies 105. For example, the procedures may be utilized with only two tires, in an automotive service center while sequentially servicing multiple vehicles, or on an industrial assembly line, during service of an indefinite number of similar wheel assemblies 105.

To increase safety during unattended operations, the controller 202 of the tire changer machine 100 is preferably configured to require at least two specific operating conditions before carrying out an unattended tire dismount procedure of the present disclosure. First, before the controller 202 will permit an operator to initially select a "SAME AS LAST" tire demount operation via button 352, such as shown in FIG. 6, the controller 202 is programmed to require that an immediately previous tire demount procedure, which is to be repeated with the next wheel assembly 105, have been completed successfully under operator guidance (such as by maintaining the dead-man control input 220) without any interruptions such as from warnings, failed steps in the process, or operator intervention. Second, for each subsequent selection of a "SAME AS LAST" tire demount operation via button 352, the controller 202 is programmed to require that immediately previous tire demount procedure, which is to be repeated with the next wheel assembly 105, have been completed successfully autonomously without any interruptions such as from warnings, failed steps in the process, or required operator intervention.

Additional safety features may optionally be included in the tire changer machine 100 to reduce the risk of machine damage, tire or wheel damage, or bystander injury during unattended operations. For example, force limits may be established for loads applied along one or more axes to components of the tool assembly 114, such as the tire hook and tools 116, 118. In the event a force limit is exceeded, such as in the event a tire fails to fully demount from a wheel, the controller 202 is programmed to terminate all operations, and await suitable operator intervention.

Figure 8:
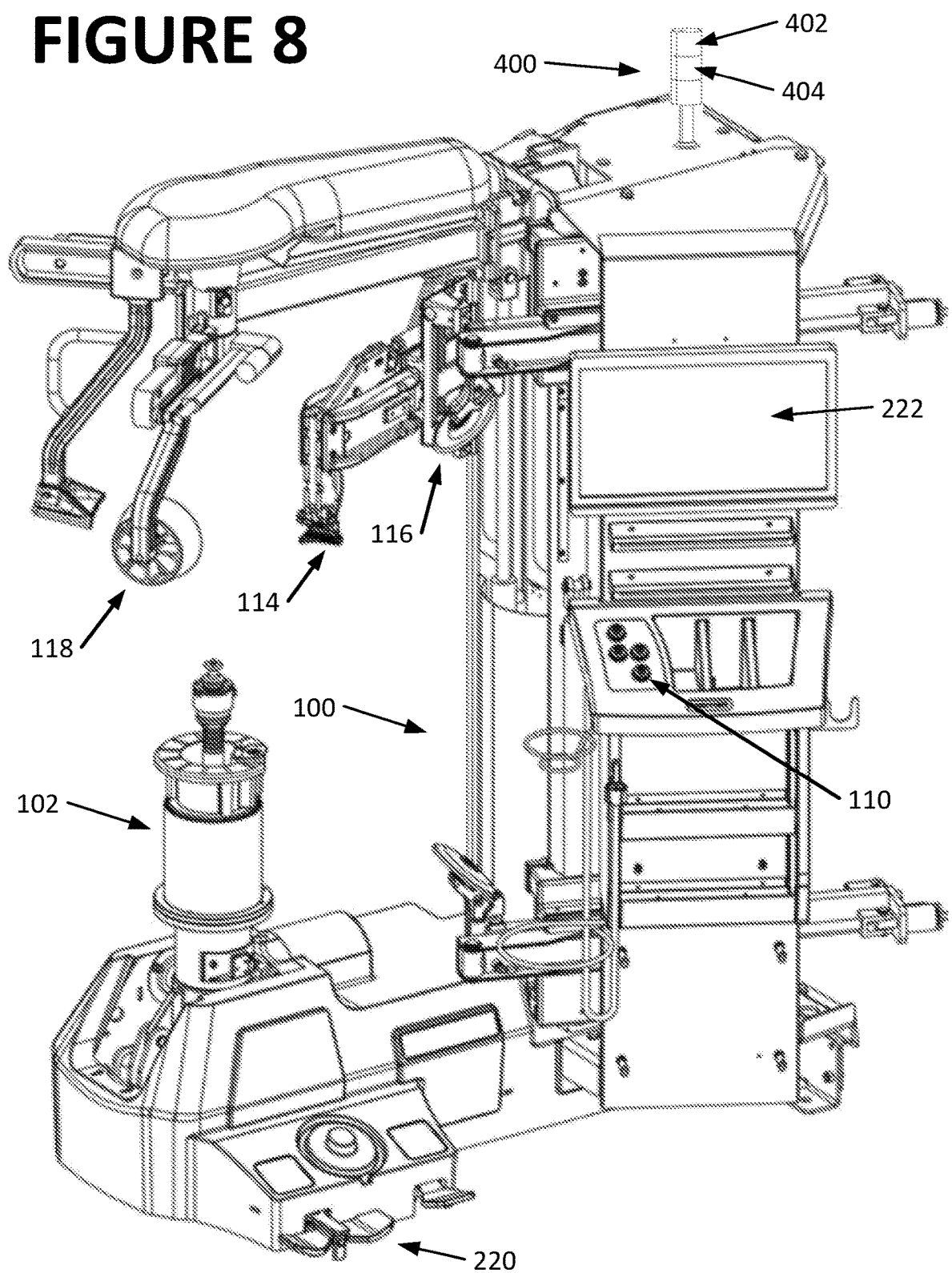
FIG. 8 is a perspective view of a tire changer system of the present disclosure.

When an operator is not in attendance at the tire changer machine 100, it is beneficial to provide a means for the operator to visually assess the operating status of the machine from a distance. As seen in FIG. 8, a status illuminator 400, or stack light, is optionally secured to the support tower 130, and is operatively coupled to the controller 202. The controller 202 is programmed to activate the status illuminator 400 to provide a visual indication of the operational status of the tire changer machine 100 during autonomous operation. In an exemplary configuration, the status illuminator 400 includes a red light source 402 and a green light source 404. During normal operation of the tire changer machine 100, the controller 202 activates the green light source 404 to provide a steady-state illumination. When a current operation, such as an autonomous tire demount procedure, has been successfully completed, and the machine 100 is awaiting operator instruction, the controller 202 activates the green light source 404 to provide a flashing illumination. In the event of a fault detection (such as an exceeded force or load limit), process interruption, or other unexpected occurrence requiring operator attention, the controller 202 activates the red light source 402 either in a steady-state or flashing manner. Those of ordinary skill in the art will recognize that other means of signaling the operating status of the tire changer machine 100 may be utilized, such as acoustic signals, changes to the graphical user interface 222, etc., without departing from the scope of the present disclosure.

An embodiment of a tire changer machine 100 has been disclosed including: a clamping assembly configured to receive a wheel rim 106; a drive assembly configured to rotate the wheel rim 106 about an axis; a plurality of tools 114, 116, 118 selectively positionable to mount a tire on the wheel rim and demount a tire 108 from the wheel rim 106; a control system 202 configured to coordinate the plurality of tools to complete a tire change procedure in an automated manner; and a control input element 110, 220 configured to be selectively operable by a human operator, wherein the control system coordinates the tools in an automated manner to execute a repetitive sequence of tire change procedures on at least one tire in a set of wheel assemblies 105 following successful completion of an operator-guided sequence of tire change procedures on a first wheel assembly in the set of wheel assemblies.

A method of changing tires 108 on a set of wheel assemblies 105 has also been disclosed. The method is implemented with a tire changer machine 100 including a clamping assembly configured to receive a wheel rim 106, a drive assembly configured to rotate the wheel rim 106 about an axis, a plurality of tools 114, 116, 118 selectively positionable to mount a tire 108 on the wheel rim and demount a tire from the wheel rim, a control system 202 configured to coordinate the tools to complete a repetitive tire change procedure in an automated manner, and control input elements 110, 220 configured to be selectively operable by a human operator. The method includes: coordinating, with the control system, the plurality of tools to execute selected tire change procedures on a first wheel assembly 105 under operator supervision, and subsequently, with the control system, automating coordination of the plurality of tools to carry out a repetition of the selected tire change procedures on at least one additional wheel assembly 105 in the set without required operator supervision.

An embodiment of a computer program residing on a non-transitional computer readable medium for completing a plurality of different tire change procedures in an automated manner with a tire changing machine has also been disclosed. The program includes at least one code segment for instructing a processor that receives user provided selections for at least one of the plurality of different tire change procedures to be executed and options corresponding to each selected procedure, and, in response to the received selections: when each selection is received, execute the procedure in an automated manner according to the selected options if the selected option corresponds to an automated mode of operation of the machine and all conditional criteria necessary to begin an automated mode of operation have been met, or prompt operator input for manual control of the machine if the selected option corresponds to a manual mode; and display context sensitive information regarding a procedure being executed.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A tire changer machine comprising:
a clamping assembly configured to receive a wheel rim;
a drive assembly configured to rotate the wheel rim about an axis;
a plurality of tools selectively positionable to mount a tire on the wheel rim and demount a tire from the wheel rim;
a control system configured to coordinate operation of the plurality of tools;
a control input element configured to be selectively operable by a human operator to direct said control system to complete a tire demount procedure under operator supervision for an initial wheel assembly in a set of wheel assemblies; and
wherein the control system is further configured to coordinate the plurality of tools to complete, responsive to an operator command input through said control input element, an automated tire demount procedure without operator supervision for at least a second wheel assembly in said set of wheel assemblies subsequent to a successful completion of said tire demount procedure under operator supervision for said initial wheel assembly.

2. The tire changer machine of claim 1 further including a status indicator light, said status indicator light responsive to said control system to provide a visual indication of an operational condition of said tire changer machine associated with at least said automated tire demount procedure.

3. The tire changer machine of claim 2 wherein the control system is further configured to respond to a fault condition during said automated tire demount procedure by terminating operation of said plurality of tools, and by providing a distinct visual indication of an occurrence of said fault condition via said status indicator light.

4. The tire changer machine of claim 3 wherein a fault condition is signaled in response to a force exerted by at least one of said plurality of tools exceeding a maximum permissible load.

5. The tire changer machine of claim 2 wherein the control system is further configured to respond to a completion of said automated tire demount procedure by providing a distinct visual indication of said completion via said status indicator light.

6. The tire changer machine of claim 1 further including a force limiting means associated with a tire hook tool in said plurality of tools to limit a maximum permissible force or load exerted by the tire hook tool along a vertical axis during said automated tire demount procedure.

7. The tire changer machine of claim 6 wherein said force limiting means is a limit valve assembly disposed within a hydraulic actuator for said tire hook tool.

8. The tire changer machine of claim 6 wherein said force limiting means includes a force or load sensor, and wherein said control system is responsive to a signal from said force or load sensor indicating a force associated with movement of said tire hook tool along said vertical axis is at, or is exceeding, said maximum permissible force or load to terminate operation of said plurality of tools.

9. A method for a single operator to replace tires on a set of wheel assemblies, implemented with a tire changer machine including a clamping assembly configured to receive a wheel rim, a drive assembly configured to rotate the wheel rim about an axis, a plurality of tools selectively positionable to mount a tire on a wheel rim and demount a tire from a wheel rim, a control system configured to coordinate the tools to complete at least a portion of a tire change procedure in an automated manner, and a control input element configured to be selectively operable by said single human operator, the method comprising:

securing an initial wheel assembly to said clamping assembly;

in response to an operator instruction together with an indication of continued operator presence, coordinating actuation said plurality of tools with said control system to demount a first discard tire from said initial wheel assembly, and to mount a first replacement tire to said initial wheel assembly;

removing said initial completed wheel assembly from said clamping assembly;

securing a next wheel assembly to said clamping assembly;

in response to an operator "same as last" instruction, coordinating actuation of said plurality of tools with said control system to demount a next discard tire from said next wheel assembly without a required indication of continued operator presence;

mounting a next replacement tire to said next wheel assembly;

removing said next completed wheel assembly from said clamping assembly; and repeating said steps of securing a next wheel assembly, coordinating in response to an operator "same as next instruction", mounting a next replacement tire, and removing a next wheel assembly for each remaining wheel assembly in said set of wheel assemblies.

10. The method of claim 9 further including the step of terminating all action in response to a detection of a fault, a generation of a warning, or an operator interaction during said step of coordinating actuation of said plurality of tools with said control system in responding to said operator "same as last" instruction.

11. The method of claim 10 further including the step of monitoring at least one axial force exerted on at least on of said plurality of tools during said step of coordinating actuation of said plurality of tools with said control system in response to said operator "same as last" instruction; and generating a warning or detecting a fault in response to said monitored at least one axial force exceeding a limit.

12. The method of claim 9 further including the step of providing a visible indication of an operational status said during step of coordinating actuation of said plurality of tools with said control system in response to said operator "same as last" instruction, said operational status being one of a ready state, a normal operating state, and a fault state for said tire changer machine.

13. The method of claim 9 further including the step of balancing a previously completed wheel assembly from said set of wheel assemblies on a wheel balancer concurrent with said step of coordinating actuation of said plurality of tools with said control system in response to said operator "same as last" instruction.

14. A method for a single operator to replace tires on a set of wheel assemblies, implemented utilizing a wheel balancer machine and a tire changer machine configured with a control system programmed to carry out an automated tire demount procedure without operator supervision, comprising:

for a discard-tire wheel assembly in said set of wheel assemblies, completing, with the tire changer machine, a tire demount procedure under supervision of said single operator;

upon completion of said tire demount procedure, completing with said single operator and said tire changer machine, a replacement tire mount procedure to assemble an unbalanced replacement-tire wheel assembly for said set;

initiating, with the tire changer, said automated tire demount procedure for a next discard-tire wheel assembly in said set, said automated tire demount procedure proceeding without supervision of said single operator;

conducting with said single operator, during said automated tire demount procedure, a wheel balance procedure with said wheel balancer machine for an unbalanced replacement-tire wheel assembly in said set to yield a balanced replacement-tire wheel assembly for said set;

upon completion of said automated tire demount procedure for said next discard-tire wheel assembly, completing with said single operator and said tire changer machine, said replacement tire mount procedure to assemble a next unbalanced replacement-tire wheel assembly for said set;

repeating said sequence of initiating, conducting, and completing steps with each remaining discard-tire wheel assembly in said set.

15. The method of claim 14 further including the step of conducting with said single operator, a wheel balance procedure with said wheel balancer machine for a final unbalanced replacement-tire wheel assembly in said set, such that each wheel assembly within said set is a balanced replacement-tire wheel assembly.

* * * * *